United States Patent
Herz

(10) Patent No.: US 7,685,619 B1
(45) Date of Patent: Mar. 23, 2010

(54) APPARATUS AND METHOD FOR 3D ELECTRONIC PROGRAM GUIDE NAVIGATION

(75) Inventor: William Samuel Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1344 days.

(21) Appl. No.: 10/609,204

(22) Filed: Jun. 27, 2003

(51) Int. Cl.
*G06F 3/00* (2006.01)
*G06F 13/00* (2006.01)
*G06F 3/048* (2006.01)
*H04N 7/173* (2006.01)
*H04N 5/445* (2006.01)

(52) U.S. Cl. .............. 725/52; 725/39; 725/40; 725/56; 725/58; 725/61; 725/88; 725/102; 715/719; 715/782; 715/836; 715/848

(58) Field of Classification Search ............ 725/39, 725/52, 40, 56, 58, 61, 88, 102; 715/719, 715/782, 836, 848
See application file for complete search history.

(56) References Cited

U.S. PATENT DOCUMENTS

| | | | | |
|---|---|---|---|---|
| 5,485,197 | A * | 1/1996 | Hoarty | 725/37 |
| 5,539,822 | A | 7/1996 | Lett | |
| 5,673,089 | A | 9/1997 | Yuen et al. | |
| 5,678,015 | A * | 10/1997 | Goh | 715/782 |
| 5,745,710 | A * | 4/1998 | Clanton et al. | 725/60 |
| 5,870,150 | A | 2/1999 | Yuen | |
| 5,956,025 | A | 9/1999 | Goulden et al. | |
| 5,987,213 | A | 11/1999 | Mankovitz et al. | |
| 6,005,601 | A * | 12/1999 | Ohkura et al. | 725/52 |
| 6,100,883 | A * | 8/2000 | Hoarty | 715/721 |
| 6,100,941 | A | 8/2000 | Dimitrova et al. | |
| 6,192,187 | B1 | 2/2001 | Kinghorn | |
| 6,204,885 | B1 | 3/2001 | Kwoh | |
| 6,341,196 | B1 | 1/2002 | Ando et al. | |
| 6,356,706 | B1 | 3/2002 | Ando et al. | |
| 6,400,379 | B1 | 6/2002 | Johnson et al. | |
| 6,411,337 | B2 * | 6/2002 | Cove et al. | 348/563 |
| 6,421,067 | B1 * | 7/2002 | Kamen et al. | 715/719 |
| 6,456,331 | B2 | 9/2002 | Kwoh | |
| 6,473,751 | B1 | 10/2002 | Nikolovska et al. | |
| 6,499,029 | B1 | 12/2002 | Kurapati et al. | |
| 6,621,509 | B1 * | 9/2003 | Eiref et al. | 715/836 |
| 6,662,177 | B1 * | 12/2003 | Martino et al. | 707/3 |
| 6,742,184 | B1 * | 5/2004 | Finseth et al. | 725/52 |
| 6,754,906 | B1 * | 6/2004 | Finseth et al. | 725/45 |
| 6,799,326 | B2 * | 9/2004 | Boylan et al. | 725/35 |
| 6,857,128 | B1 * | 2/2005 | Borden et al. | 725/39 |

(Continued)

OTHER PUBLICATIONS

TimeWarner, Movielink Goes Online Today With New Internet Movie Rental Service, Nov. 11, 2002, http://64.233.169.104/search?q=cache:cOb_QF89wuEJ:www.timewarner.com/corp/newsroom/pr/0,20812,669573,00.html+start+date+video+rental+on+Internet&hl=en&ct=clnk&cd=1&gl=us.*

*Primary Examiner*—Hoang-Vu A Nguyen-Ba
(74) *Attorney, Agent, or Firm*—Cooley Godward Kronish LLP

(57) ABSTRACT

A system, method, and user interface for displaying electronic program guide (EPG) and personal video recorder (PVR) information as navigable three-dimensional images is described. In one embodiment, a three dimensional image is formed in which EPG data is presented on one surface of a three dimensional image and PVR data is presented on at least one other surface of the three-dimensional image.

14 Claims, 15 Drawing Sheets

U.S. PATENT DOCUMENTS 6,910,191 B2 *  6/2005  Segerberg et al. ........... 715/830
7,047,550 B1 *  5/2006  Yasukawa et al. ............. 725/44
7,201,658 B2 *  4/2007  Marshall et al. ............... 463/25

* cited by examiner

APPARATUS AND METHOD FOR 3D ELECTRONIC PROGRAM GUIDE NAVIGATION

FIELD OF THE INVENTION

The present invention relates generally to recording television programs. More particularly, the present invention relates to user interfaces for displaying electronic program guide information.

BACKGROUND OF THE INVENTION

Electronic program guides (EPGs) are used to display information about television programs. An EPG is used to list current and scheduled television programs. EPGs may also include a short summary or commentary for each program.

FIG. 1 illustrates a conventional EPG user interface for displaying EPG data. Conventional EPGs typically have an array or grid displayed on two different axes. As shown in FIG. 1, the horizontal axis is the time axis and the vertical axis is a channel axis for displaying the title of programs offered at specific times on the channels. Interactive EPGs also permit a user to select a title to access other functions, such as obtaining additional program information, changing the channel to the program, or setting up a recording session to the program.

Conventional EPGs have several limitations. First, as the number of television channels increases, a conventional EPG becomes slow and awkward for television viewers to navigate, since they must scroll through a large number of television channels. Second, the advent of digital video recorders (DVRs), also known as personal video recorders (PVRs), permits users to store a large number of recorded programs. Thus, users increasingly need to navigate back and forth between an EPG for current and scheduled programs and a menu of stored video files.

Moreover, television viewers face navigation challenges associated with the user interface. Users commonly view television from ten feet or more away from the screen and navigate the EPG with a handheld remote control. There is only so much information that can be comfortably viewed at a distance from a television screen. Images that are too small for distance viewing may create an unpleasant user experience. Therefore, what is desired is a user interface with improved navigation functionality for EPG data and PVR data.

SUMMARY OF THE INVENTION

The present invention includes a system, method, and graphical user interface for displaying media information as a navigable three-dimensional image to facilitate a user selecting program information. In some embodiments, the three dimensional image may include: combinations of planar surfaces, cylindrical surfaces, spherical surfaces, or surfaces having a non-linear scale, such as a logarithmic scale. The media information may include an electronic program guide (EPG) associated with current and scheduled upcoming television channels, information associated with stored video files, such as personal video recorder (PVR) guide for stored video files, video file buffer information, or other types of media files.

One embodiment of a method includes displaying a first type of program information on a first surface, and displaying a second type of program information on a second surface, wherein program information of at least two types is displayed as a three-dimensional image.

One embodiment of a graphical user interface includes a first surface for displaying an EPG and a plurality of objects for representing information for stored files disposed on another surface, wherein the first surface and the other surface form a three-dimensional image.

One embodiment of a system includes a computer receiving electronic program information, a graphics processor coupled to the computer for forming three-dimensional graphical images on a visual display, and a personal video recorder coupled to the computer for storing video files, the computer configured to display a three-dimensional image of electronic program guide information and objects representing stored video files such that a user may move the three-dimensional image to navigate through program information.

One aspect of embodiments of the present invention is that program information is presented as a navigable three-dimensional image that may be moved to reveal additional program information. This also permits contextual visual clues, such as partially hidden surfaces, to be displayed to assist a user to avoid becoming confused when navigating program information for a large number of television channels or stored video files.

BRIEF DESCRIPTION OF THE DRAWINGS

The invention is more fully appreciated in connection with the following detailed description taken in conjunction with the accompanying drawings, in which:

FIGS. 4A-4F illustrate aspects of exemplary three-dimensional surfaces for displaying program information;

Like reference numerals refer to corresponding parts throughout the several views of the drawings.

DETAILED DESCRIPTION

Figure 1:
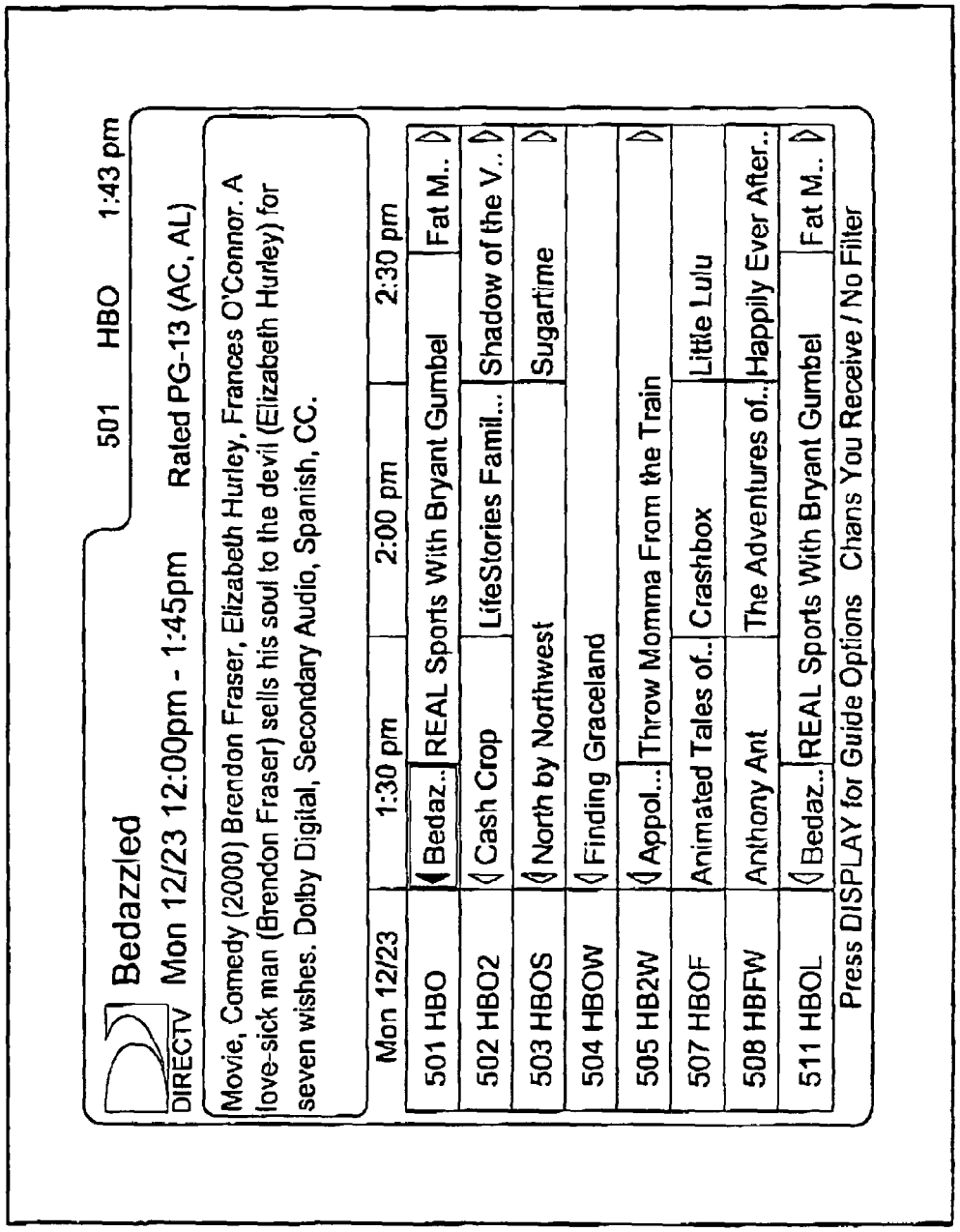
FIG. 1 illustrates a prior art EPG.
Figure 2:
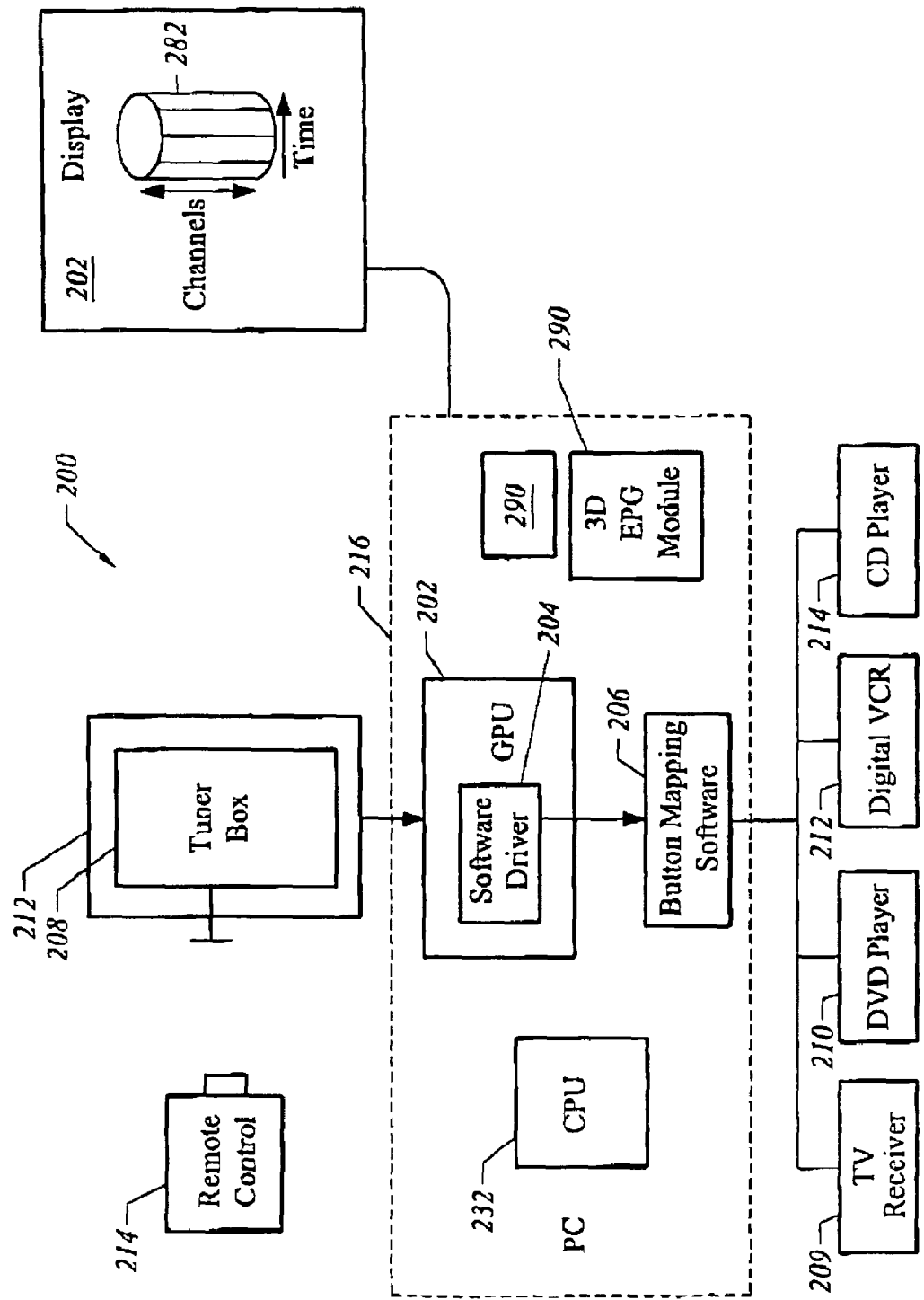
FIG. 2 is a block diagram of a system in accordance with one embodiment of the present invention.

FIG. 2 shows an exemplary system 200 for presenting program information, such as an electronic program guide (EPG), and a personal video recorder (PVR) guide, as three-dimensional images. System 200 has audio-visual devices that include a television receiver 209 and a PVR 212 (also known as a digital video recorder). Television receiver 209 receives a television signal and EPG data providing program information, such as from a satellite signal or a cable STB. PVR 212 includes a memory for storing audio-visual files, such as MPEG-2 compressed video files in digital format. Stored audio-visual files have associated program information. For example, stored audio-visual files may have program information input by a user or obtained from EPG data. Additionally, in some embodiments PVR 212 may store video files not directly recorded from television, cable, or satellite delivery, such as video files loaded from a DVD or downloaded from the Internet. For this case, the program information may be input by a user or obtained from metadata associated with the digital video file. Other types of audio-visual devices, such as a DVD player 210 or a CD player 114 may also be optionally included in the system 200.

The audio-visual devices are coupled to a personal computer (PC) 216 or other controller having a central processing unit 232. PC 216 includes a graphical processor unit (GPU) 202 for generating three-dimensional images responsive to commands from CPU 232 and a software driver 204 for interacting with the audio-visual devices. A tuner box 208 communicatively coupled to PC 216 permits commands from a remote control 214 to be input to PC 216. Remote control 214 may, for example, be a multi-function remote control that permits the user to switch between different types of audio-visual devices via button mapping software 206. Remote control 214 includes control surfaces, such as arrow keys or mouse buttons, to navigate through an image on display 202 and to enter commands to select portions of the image.

System 200 may be implemented in several different ways. In one embodiment, system 200 is implemented as a TV tuner card inserted into a PC. In this embodiment the TV tuner card may include a graphics processor chip, DMA engine for importing compressed A/V (as is the case of satellite content delivery), MPEG encoders for digitally recording video files, interfaces for communicating between the card and a television and/or other media devices, and memory for recorded video. An example of such a TV card is the Personal Cinema® card developed by the Nvidia corporation of Santa Clara, Calif. Alternatively, it will be understood that all or part of system 200 may be implemented as a set-top box. For example, the functionality of computer 216 may be integrated into a stand-alone digital video recorder or as part of a television having built-in digital video recording capability.

PC 216 includes a 3D EPG 290 module to generate a navigable three-dimensional image 282 representing program information on display device 202. In one embodiment, the 3D EPG module 290 is implemented as executable instructions stored in a local memory for processing by GPU 202. In one embodiment, 3D EPG module 290 is written in a high-level graphics language, such as the Cg language. The Cg language developed, in part, by the Nvidia Corporation, is a programming language that facilitates implementing various graphics effects.

FIG. 2 illustrates a three-dimensional image 282 of an EPG which is a cylinder having channels displayed on a vertical axis and time display along the circumference of the cylinder. 3D EPG module 290 may be configured to act in response to commands input from a remote control 214, computer mouse, or other user input device that communicates commands to PC 216.

In the present invention, three-dimensional images representing program information are rendered to present program information, such as EPG or a guide to stored video files. Additionally, three dimensional transition effects may be used to assist a user to navigate EPG and PVR data without losing their context. In one embodiment, the three-dimensional image 282 is navigable in that commands input by a user permit the three-dimensional image to be moved, i.e., translated, rotated, or scaled such that the viewpoint of the image appears to change to reveal portions of the image initially hidden from view. In another embodiment, the three-dimensional image is navigable in that a user may select regions of the three-dimensional image to access additional two-dimensional or three-dimensional representations of program information. As described below in more detail, in some embodiments one surface of the three-dimensional image represents a first type of program information and a second surface represents another type of program information.

Figure 3:
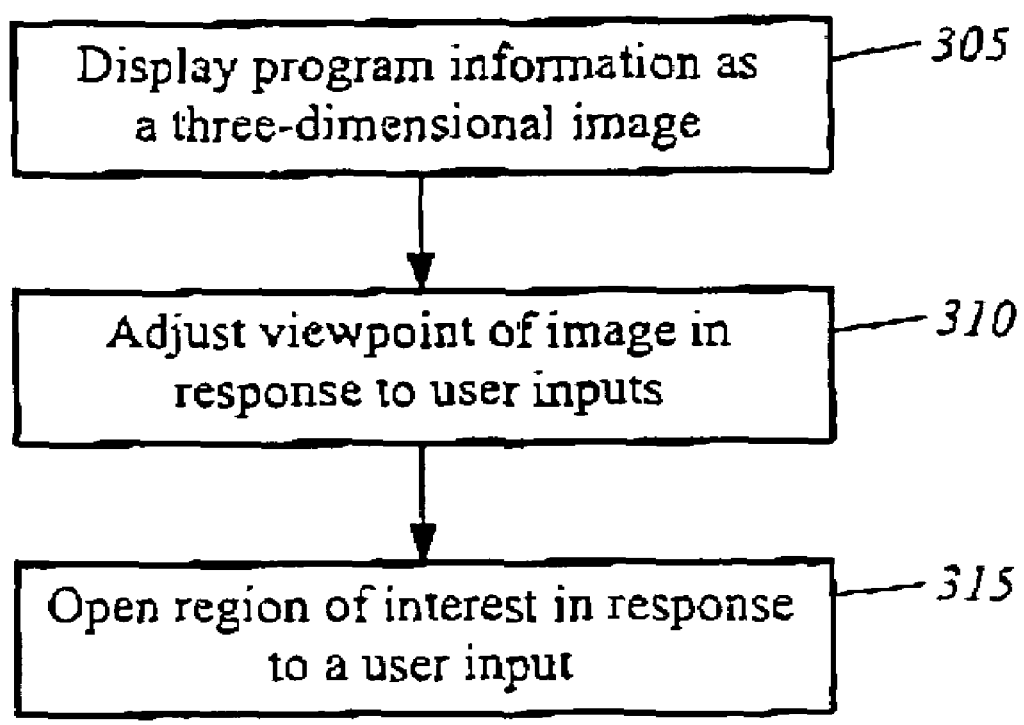
FIG. 3 is a flowchart illustrating one embodiment of a method in accordance with one embodiment of the present invention.

FIG. 3 is a flowchart illustrating a general method of the present invention. In one embodiment, media information is displayed 305 as a three-dimensional image that may include an EPG, PVR data, or both an EPG and PVR data. A three-dimensional image representing program information is displayed 305. The viewpoint of the image is adjusted 310 in response to a user command, permitting the user to navigate the three-dimensional image. In response to a user input, a region of interest of the three-dimensional image is opened 315 to permit a user to obtain additional information about a program of interest.

Figure 4A:
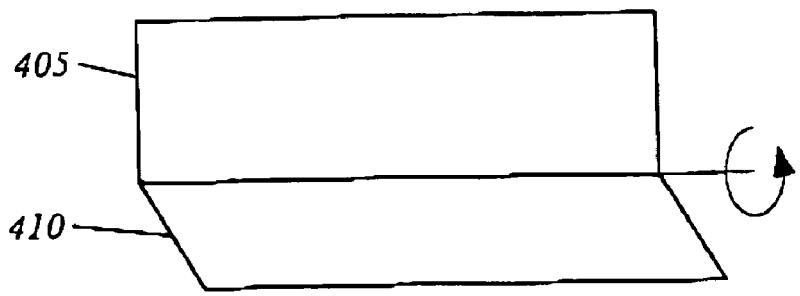

FIGS. 4A-4F illustrate some exemplary three-dimensional image types for displaying program information. In one embodiment, the three dimensional image includes at least a first planar surface 405 and a second planar surface 410, as illustrated in FIG. 4A. For example, one planar surface 405 may be used to represent EPG data and the other surface 410 used to represent PVR data. Rotation or translation of the image may be used to increase the visibility of one of the surfaces with respect to the other, where a surface contains either data information or visual information.

In another embodiment, the three dimensional image includes a non-planar curved surface, such as illustrated by the cylinder of FIG. 4B. Rotation and/or translation of the curved surface 415 with respect to an axis 420 may be used to bring regions of interest into view on surface 415. For example, program information may be displayed on a vertical channel axis and a time axis displayed on the circumference of the cylinder. Alternatively, a vertical axis may be used to display general categories of content and sub-categories of content may be displayed in surfaces regions corresponding to portions along the circumference. Additionally, as described below in more detail, the circumference of the curved surface may include media thumbnails (e.g., still or moving images) representing program information. Some of the benefits of using a curved surface, such as a cylinder or sphere, are that it provides a visually inclusive and intuitive graphical interface that permits a user to, navigate content of interest to the center of the viewpoint.

For embodiments with curved surfaces, in some embodiments when the cursor is placed on the curved surface it is mapped to a local coordinate system on the curved surface to facilitate navigation of the curved surface. Additionally, in one embodiment by selecting a portion of the curved surface a point on the curved surface may be grabbed to initiate rotation of the curved surface. Additionally, in one embodiment 3D animation may be used to move objects from the broad view to a focused view.

In still yet another embodiment, the three-dimensional image may comprise a polyhedron 430, such as a cube, as illustrated in FIG. 4C, having a plurality of exposed facets 435-A, 435-B, and 435-C along with one or more facets hidden from view due to the viewpoint. Rotation of the image with respect to an axis 440 reveals different facets of the polyhedron. In one embodiment described below in more detail, each facet of a polyhedron may have a media thumbnail associated with it (e.g., a still or moving image).

Figure 4D:
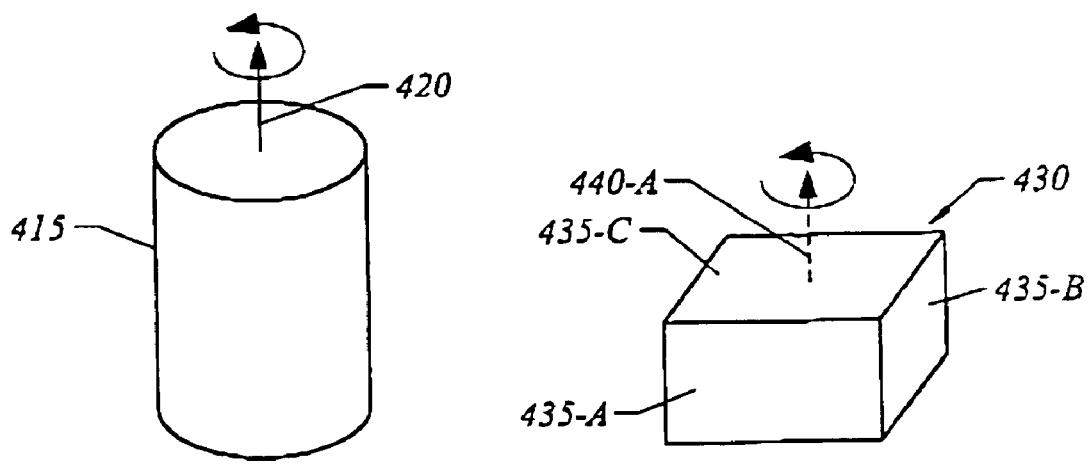
Figure 4D:
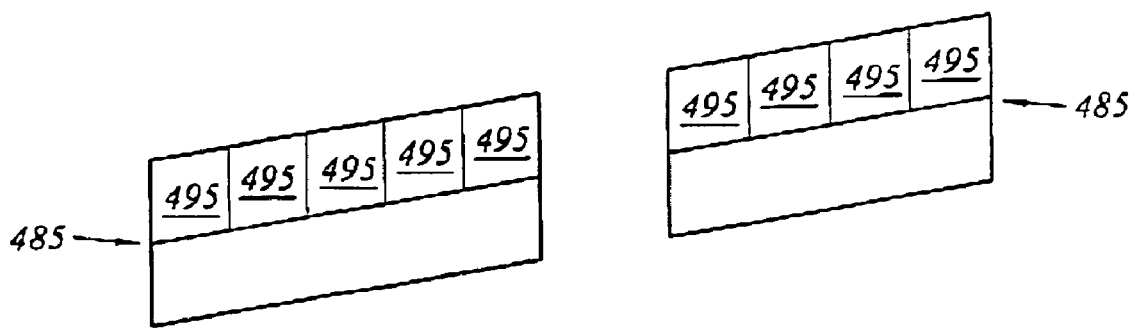

Alternatively, the three-dimensional image representing program information may comprise a more complex image, such as a representation of rows 485 of videocassettes 495 (e.g., with cover art or screen shots) arranged by content to represent a video rental store, as illustrated in FIG. 4D. In this example, adjusting the viewpoint may be used to emulate the experience of walking through a video store while viewing displayed video-cassettes or DVDs. Each representation of a videocassette 495 may include a media thumbnail (e.g., a still image, a moving image, or a movie trailer) to represent the stored video file.

Figure 4E:
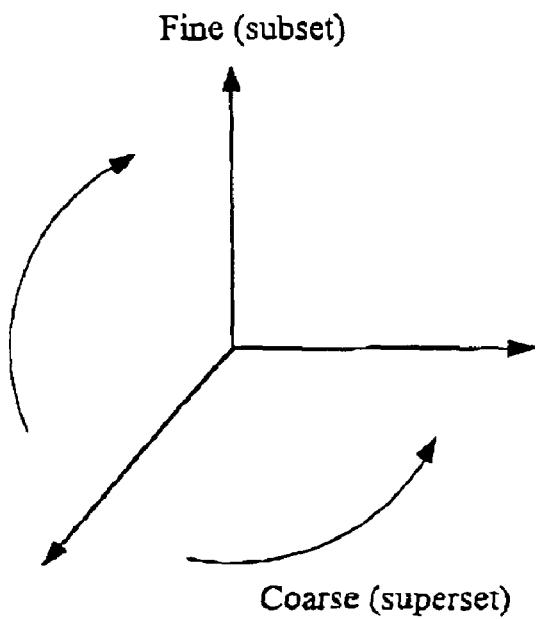
Figure 4F:
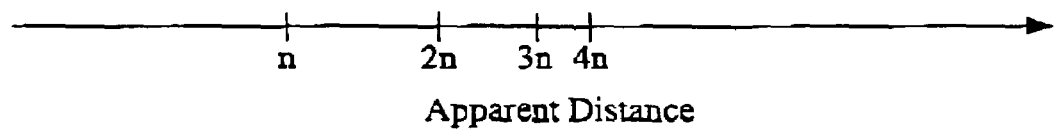

Referring to FIGS. 4E and 4F, one aspect of the present invention is that rotation and/or translation of a three-dimensional surface may be used to obtain coarse tuning and fine-tuning. In navigating a large number of channels and/or stored files a user may want to have two different levels of detail presented. For retaining context of navigation, a low level of detail is desired. However, for searching channels/files of interest, a higher level of detail is desirable. Referring to FIG. 4E, in one embodiment rotating a three-dimensional surface in a first direction (e.g., in the x-y plane) results in coarse tuning whereas rotating in a second direction (e.g., in the x-z plane) results in fine-tuning. In some embodiments, geometric effects are used to make program information within certain ranges have a larger apparent size. In one embodiment, illustrated in FIG. 4F, at least one axis of the surface has a non-linear scale. For example, the channel axis may have each progressive range, n, of channels afforded a smaller amount of screen space by either changing the scale of presentation or by curving the surface away from the user to cause an apparent reduction in size of selected channel ranges.

Figure 5:
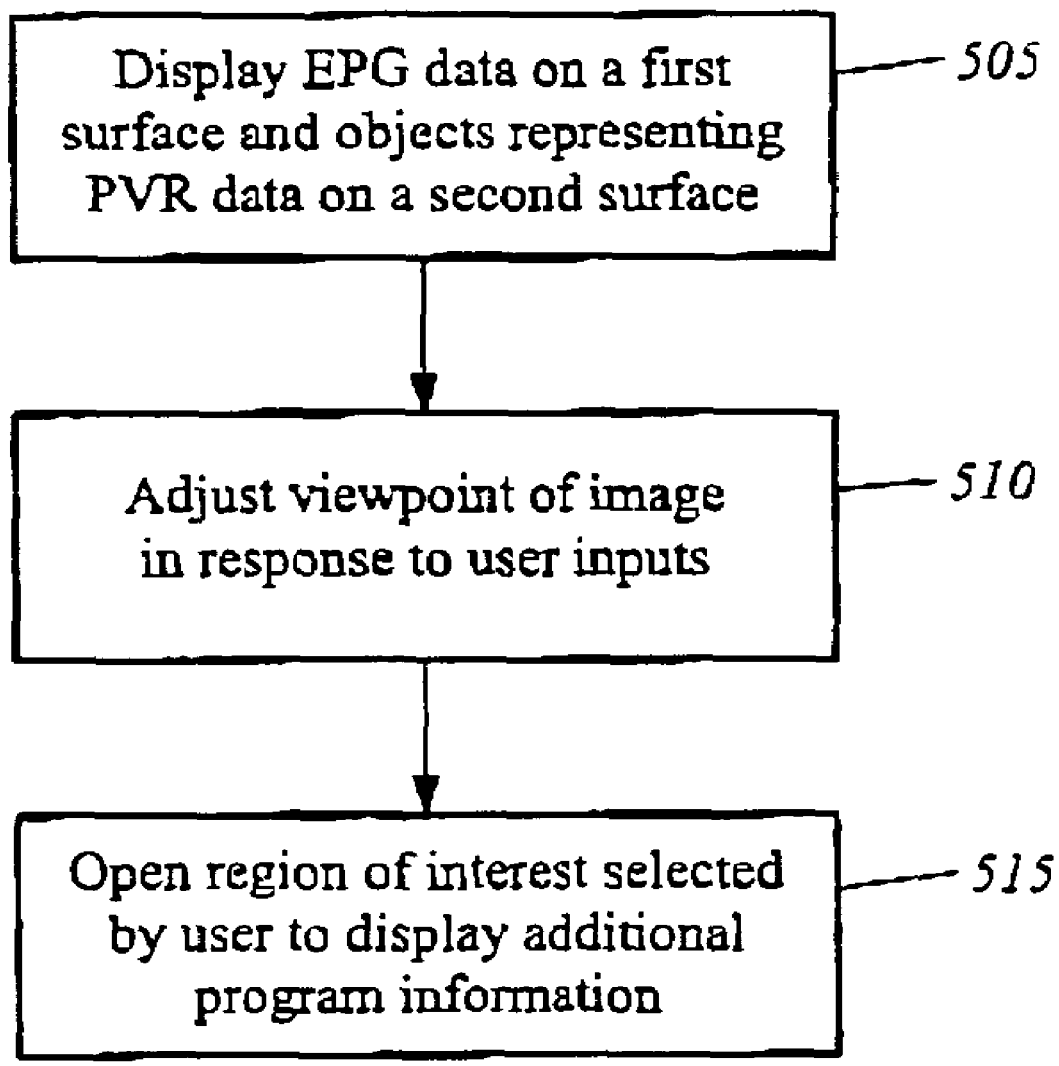
FIG. 5 is a flowchart illustrating another method in accordance with an embodiment of the present invention.

FIG. 5 is a flowchart illustrating in more detail one embodiment of a method of the present invention. In this embodiment, EPG data is displayed 505 on a first surface and PVR data is displayed as objects along a second surface. The viewpoint of the image may be adjusted 510 in response to a user input, such as by rotating the image. A region of interest selected by a user is opened 515 to display additional program information, either as a two-dimensional or three-dimensional representation of additional program information.

Figure 6:
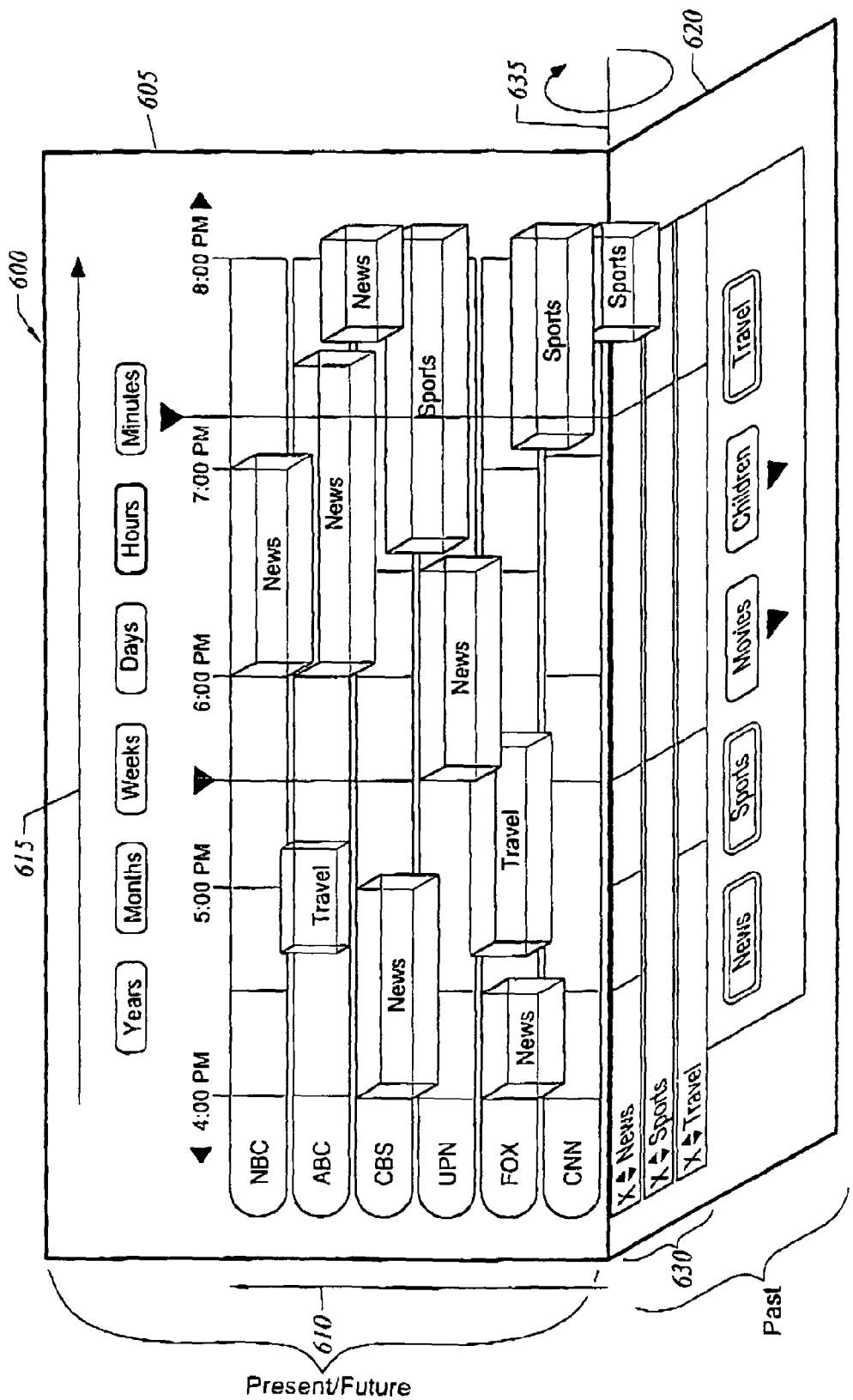
FIG. 6 illustrates a three dimensional image representing EPG and PVR data and an associated axis of rotation for the image.

A method of navigating EPG and PVR data is further illustrated in regards to FIGS. 6-11. Referring to FIG. 6, in one embodiment information on past programs (i.e., stored PVR programs) is displayed on one surface and EPG information for present/future programs is displayed on another surface. An EPG is displayed as a user interface 600 having a first surface 605 having a channel axis 610 and a time axis 615. In one embodiment a user may select the time scale of interest, such as by day, week, or month. More generally, electronic program guide information may also be displayed on a surface in which at least one of the channel and time axes has a non-linear scale, such as a logarithmic time scale. For example, a non-linear time scale may be used to emphasize time intervals close to the present time. Alternatively, a non-linear channel scale may be used to emphasize certain channels, such as a logarithmic channel scale.

PVR program information for stored video files is displayed on a second surface 620. Second surface 620 may include categories 630 of content for classifying stored content. In one embodiment, the first surface 610 and second surface 630 are orthogonal to each other, such that they form an x-y plane and an orthogonal x-z plane connected at an axis 635. In one embodiment, within each plane, objects can emerge in the third dimension to emulate a drawer opening.

One benefit of the three-dimensional representation is that a user may view both EPG data and PVR data simultaneously. Additionally, in one embodiment, a user may input commands to rotate the image about an axis 635 to provide a better view of EPG data or PVR data, depending upon the preference of the user. The ability to move the three dimensional image provides, among other benefits, an improved capability for a user to access a large amount of EPG/PVR data without losing their orientation and context.

Figure 7:
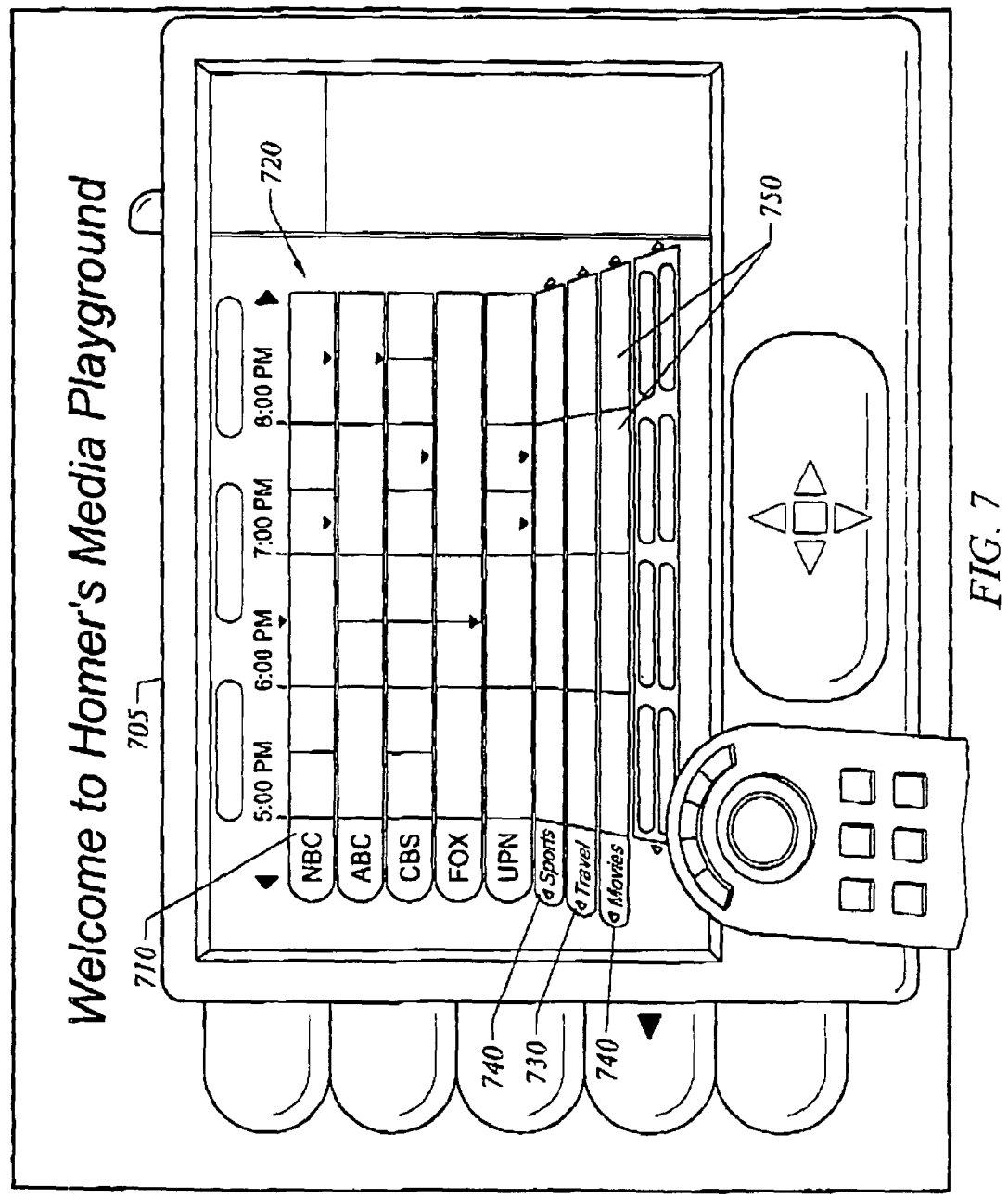
FIG. 7 illustrates a three dimensional image displayed on a media player having an EPG surface and a PVR surface.

FIGS. 7-11 are exemplary screen shots illustrating navigation of a three dimensional image of EPG and PVR data similar to that of FIG. 6. As illustrated in FIG. 7, a three dimensional image 710 representing EPG data and PVR data may be displayed on a media player, window 705. In this example, the EPG data is represented on a channel vs. time surface 720. A user may navigate the EPG using a user interface to move a cursor across the surface of the EPG and select individual programs. PVR data is represented on the second surface 730 by objects representing categories of content and associated sub-categories. For example, the objects may include general categories 740 for sports, travel, and movies arranged into subcategory objects 750 of content across second surface 730. Note that in the screen shot of FIG. 7 that the viewpoint is such that the EPG surface faces the user face-on.

Figure 8:
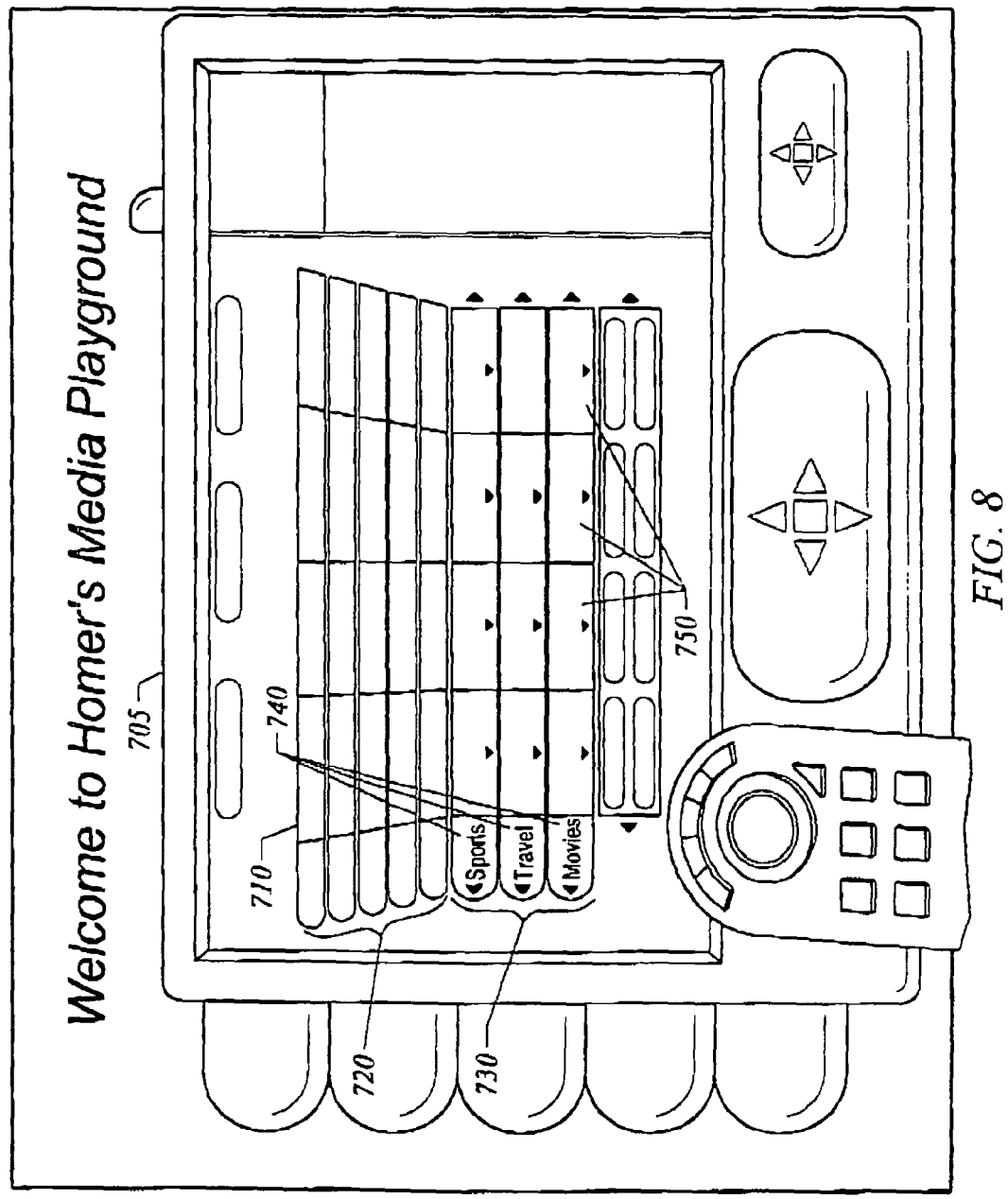
FIG. 8 illustrates rotation of the image of FIG. 7 to display PVR drawers of content.

Referring to FIG. 8, in response to a user command, image 710 is rotated such that the PVR surface 730 is presented face-on to the user. Thus, by comparing FIGS. 7 and 8 it can be seen that navigation of EPG data and PVR data is facilitated by the ability to change the viewpoint with respect to the image, i.e., by rotating the image. Additionally, contextual information is provided that aids a user to maintain their orientation. First, rotation provides a visual cue of the change from viewing EPG data face-on to viewing PVR data face on, and vice-versa. Second, when one of the surfaces is viewed face-on, the viewpoint is selected such that a partial view of the other surface is maintained, providing a visual clue to the user which may, for example, assist a user to switch back and forth between viewing EPG data and PVR data (e.g., recorded content) while maintaining their orientation.

Figure 9:
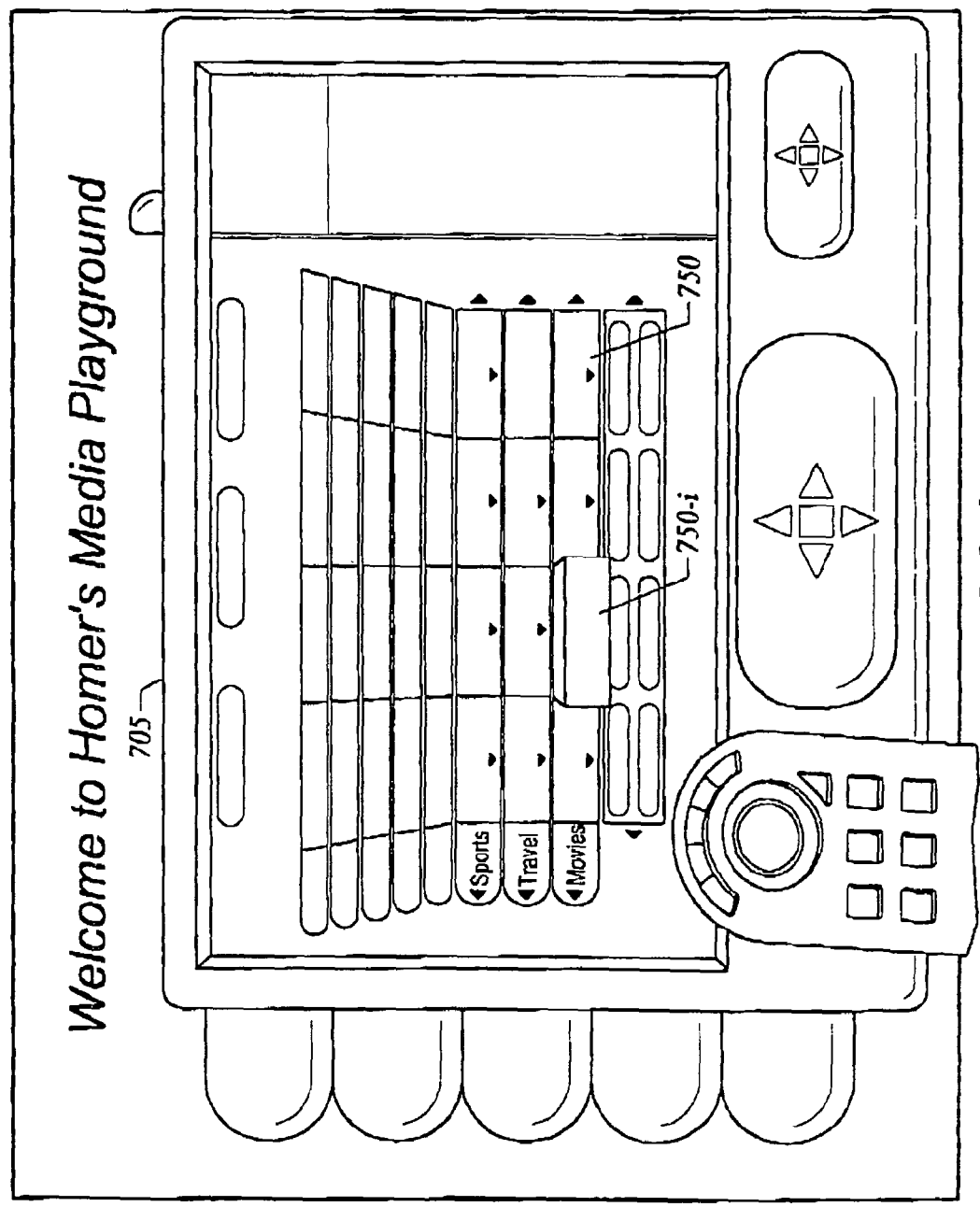
FIG. 9 illustrates the opening of a drawer of content of FIG. 8.

Referring to FIG. 9, in one implementation, the objects 750 representing subcategories of PVR data are drawers of content. A drawer may represent a sub-category of content by subject matter. Alternatively, a drawer could represent other ways to organize sub-categories of content, such as by genre, television series, by actor, or by date. A user may scroll through the drawers (e.g., through commands input by a remote control) and input a command to select a drawer. A selected drawer 750-i opens to access additional information regarding the stored video files.

Figure 10:
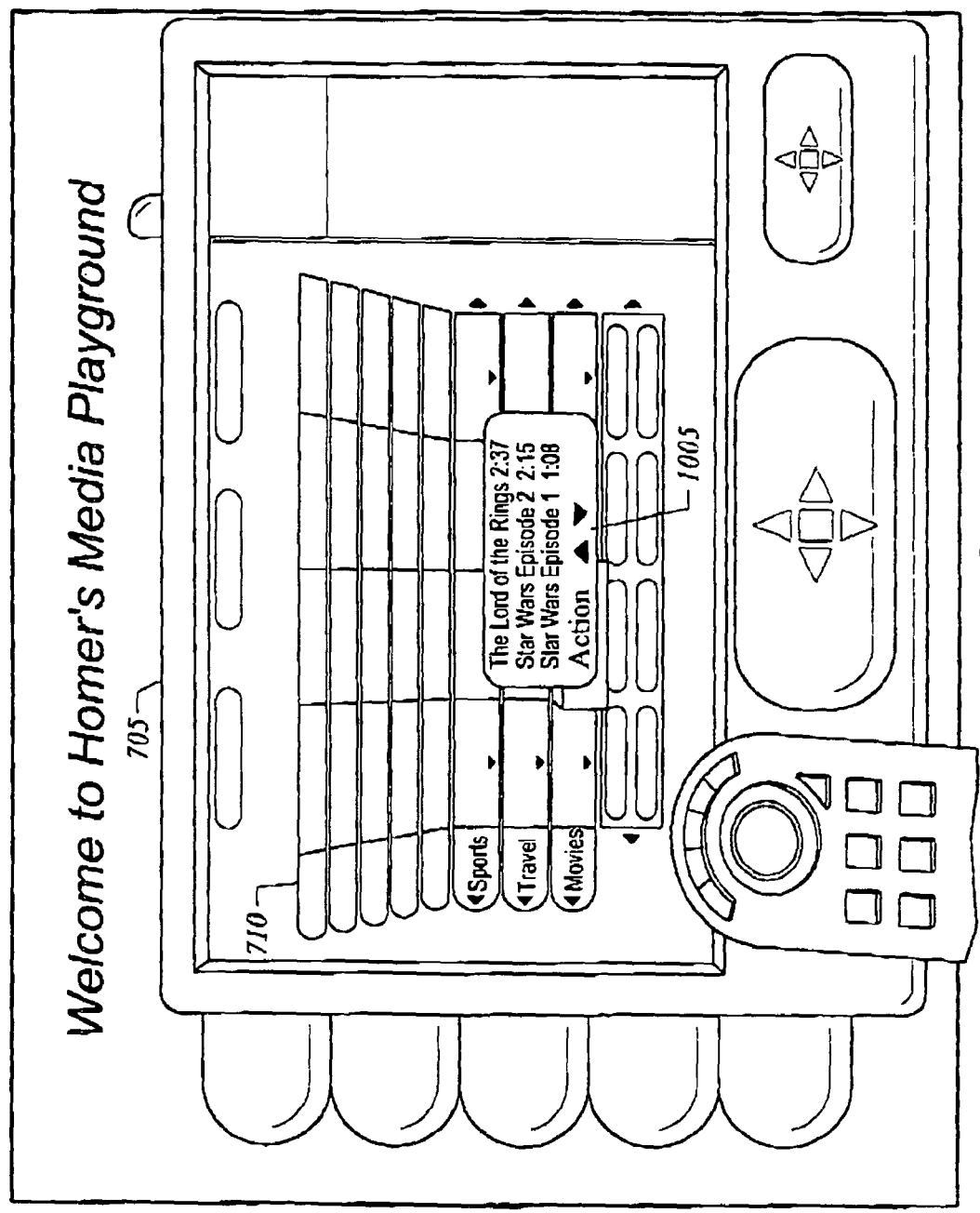
FIG. 10 illustrates the display of a menu list for displaying program information for an opened drawer of content of FIG. 9.

Referring to FIG. 10, in one embodiment, opening a drawer 750-i results in the display of a two-dimensional representation of content, such as a list of titles of stored content opening up for the sub-category. A user may then select a title to obtain more information or to open up the associated content.

Figure 11:
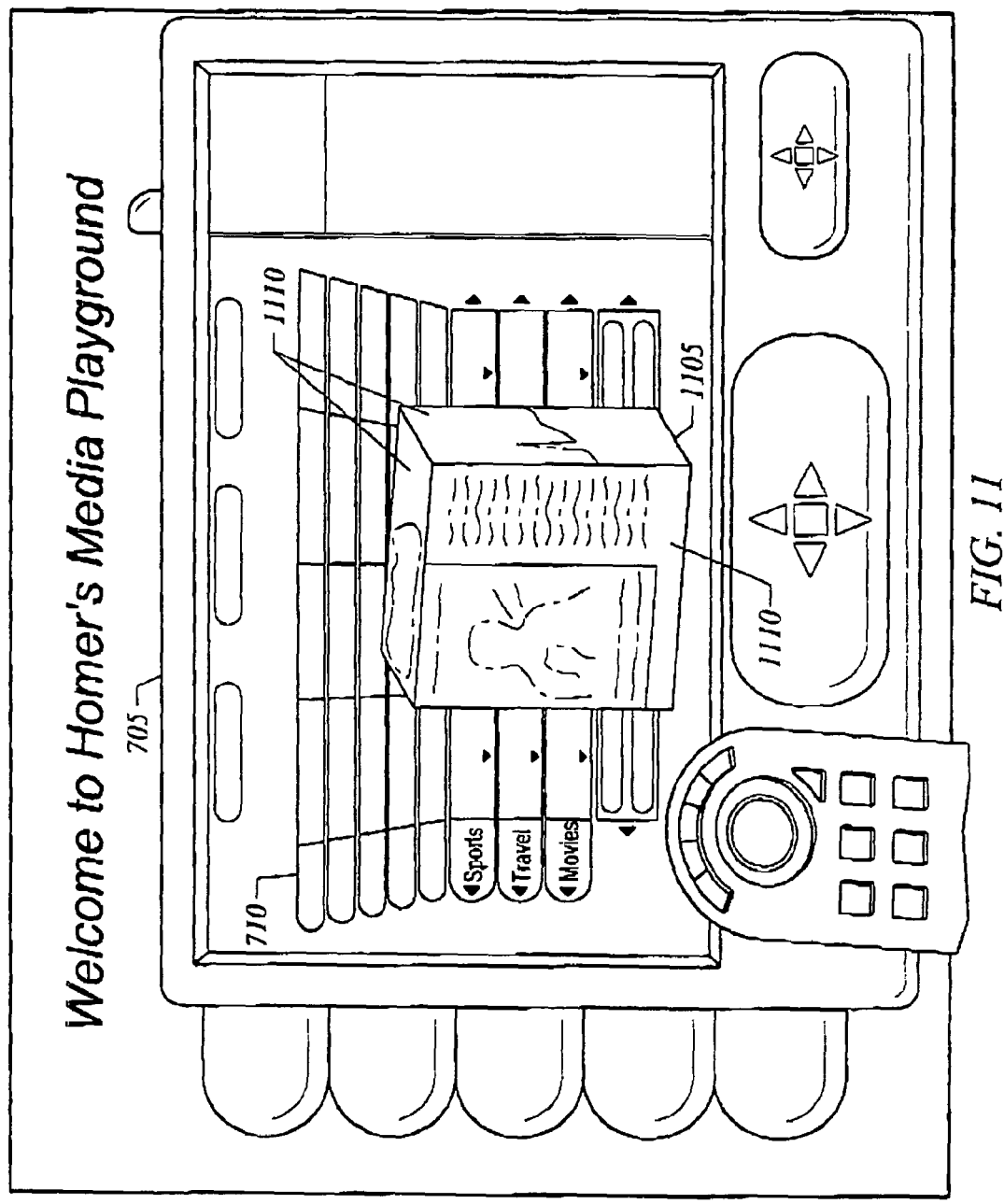
FIG. 11 illustrates the display of a polyhedron having media thumbnails for displaying program information for an opened drawer of content of FIG. 9.

Alternatively, opening a drawer 750-i may generate a three-dimensional image appearing to represent attributes of one or more stored video files. As illustrated in FIG. 11, a drawer may open to reveal a pop-up 1105 representation of a three-dimensional surface to display information about the content, such as a polyhedron having media thumbnails 1110 associated with each facet of the polyhedron, such as on each face of cube. The media thumbnails may be an audio thumbnail (e.g., a short audio clip) or a video-thumbnails (e.g., a static frame or a short video clip or loop), such as DVD cover art.

In one embodiment, a user selects the media thumbnail for stored video files using a button on a remote control. Alternatively, the media thumbnail may be selected automatically by software. For example, the exemplary polyhedron 1105 shown in FIG. 11 has media thumbnails comprising still images on each facet 1110. The images, may, for example, be selected automatically, such as by selecting title images and/or other images from a video file.

Figure 12:
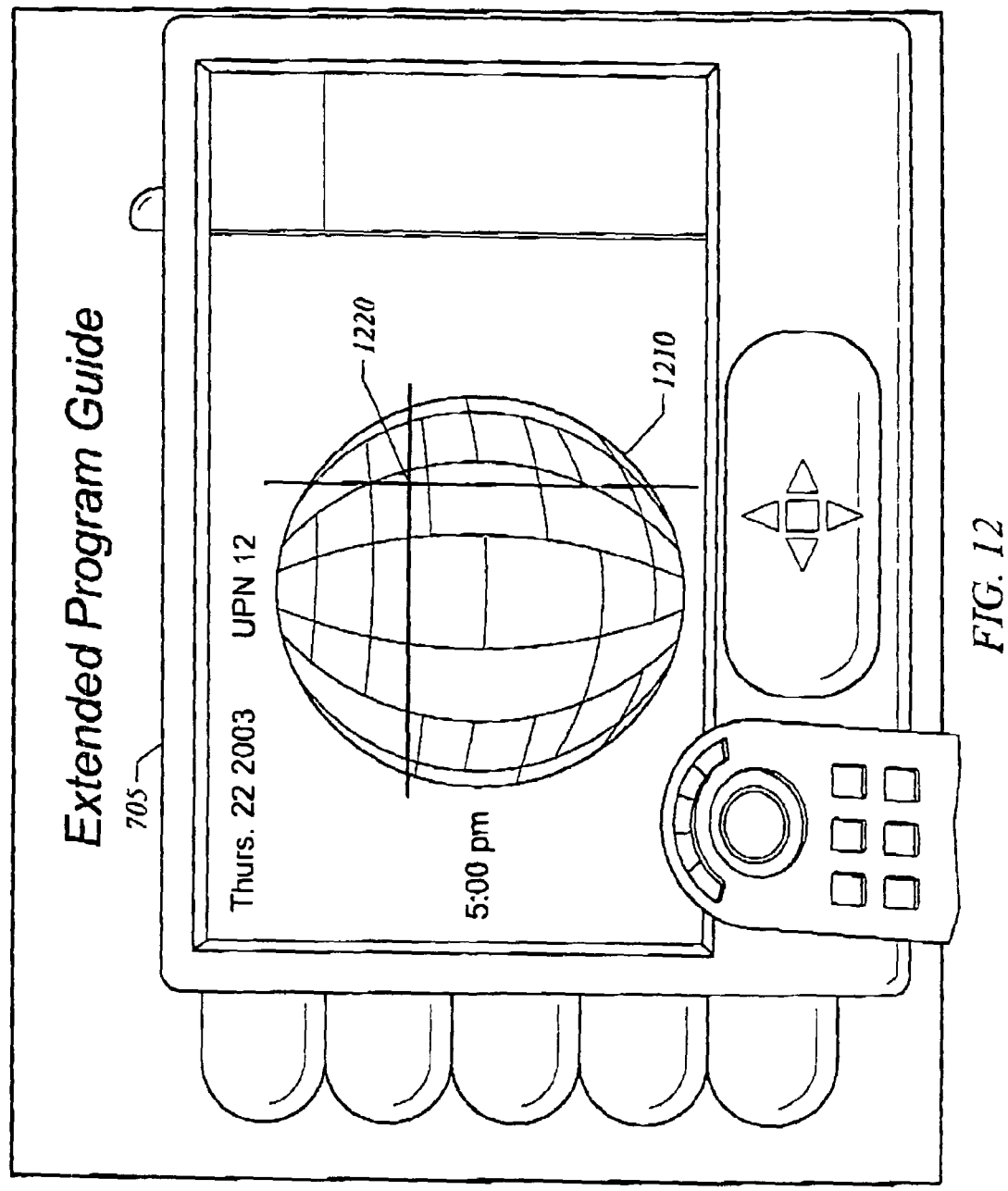
FIG. 12 illustrates an embodiment of a spherical EPG displayed on a media player.
Figure 13:
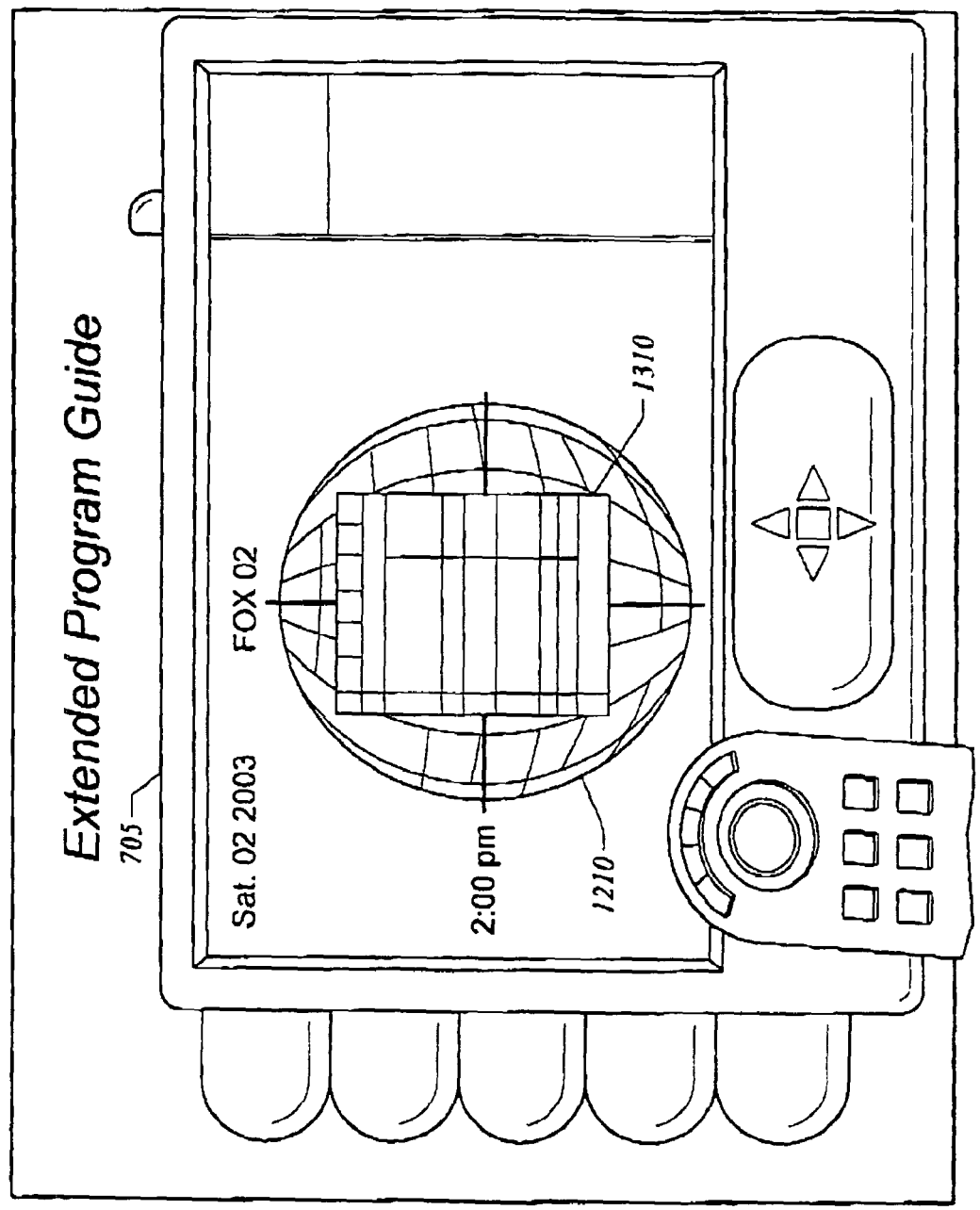
FIG. 13 illustrates opening a region of interest of the spherical EPG of FIG. 12 to reveal EPG information.

As previously discussed, program information may be displayed on a non-planar surface, such as a curved surface. Referring to FIG. 12, in one embodiment, EPG data is displayed on the surface of a sphere 1210. A user may then select a region of interest on the sphere to obtain detailed program information 1310, as indicated in FIG. 13. Note that a cursor 1220 can be displayed on the local coordinates of the surface of the sphere. In one embodiment, a user may enter a select command to "grab" the point at the center of the cursor and move the sphere about that point (e.g., rotate the sphere to translate the selected point). This permits a "random access" method of display in which a surface may be easily rotated to reveal regions of interest to the user.

Another aspect of curved surfaces such as the sphere of FIG. 12 relates to the apparent size of regions of the curved surface. Each portion of a curved surface faces a user at a different angle and at a different offset (in model space) from the user. Regions of the sphere that, in model space, are closest to the viewpoint and/or directly facing the viewer appear to have a larger area. Thus, some types of information (e.g., pictures and large font text) may be visible on all regions of the sphere whereas other types of information (e.g., small font text) may be visible only on regions of the sphere brought directly facing the user. This permits the level of detail to be sufficient for a user to preserve context while they navigate the curved surface while also efficiently using screen space. Additionally, it allows random access to all programs at all times.

Figure 14:
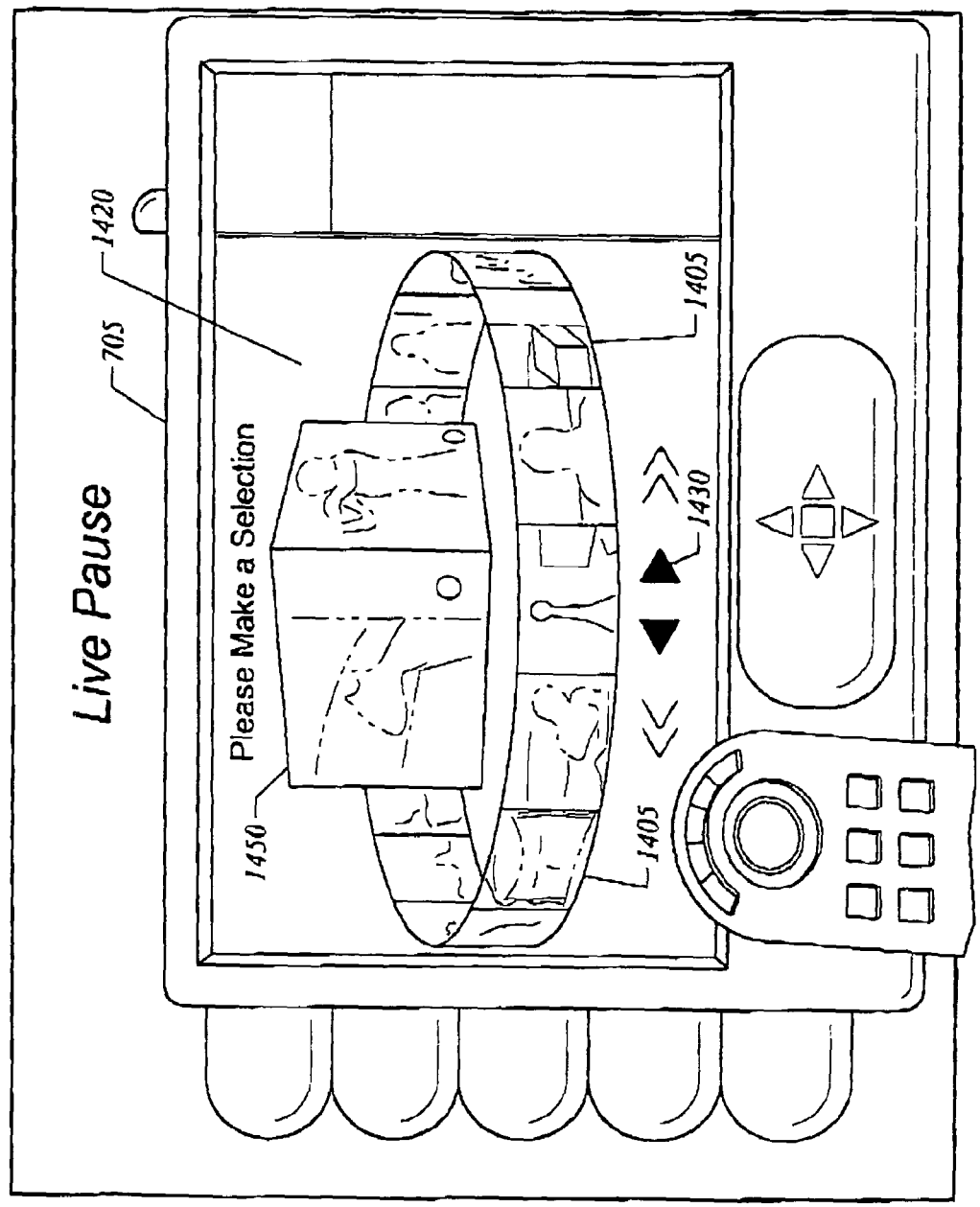
FIG. 14 illustrates an embodiment for displaying program information for a video fill buffer on a media player.

Embodiments of the present invention include a three dimensional image having media thumbnails arranged to represent a time sequence of content, such as a video file buffer or a live pause buffer. PVRs commonly include a time shift buffer or a live pause buffer. Referring to FIG. 14, media thumbnails 1405 may be arranged in a time sequence, such as a sequence arranged as a disc or cylinder 1420. In this embodiment, each media thumbnail 1405 may correspond to an instant in time of a video file buffer (e.g., one image per pre-selected unit of time to represent the flow of content within the video file buffer). A user may then input a command to rotate disc 1420 to bring a media thumbnail into view, such as by selecting a rotation arrow 1430. Additionally, a polyhedron 1450 having media thumbnails to represent program information for the video file may also be presented.

In some embodiments, a user may request one or more calendar panes to be displayed for EPG data. In one embodiment, a user may define the time and channel attributes of the calendar pane. In some embodiments a user selects a portion of an EPG surface and then may request that a calendar pane be opened to show EPG data in more detail for the selected portion of the EPG surface.

It will be understood that in addition to other embodiments, the software for displaying three-dimensional program information may also be provided as a software upgrade, such as software embodied in a storage medium of available through a signal-bearing medium, such as software downloadable from the Internet. Consequently, an embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using the JAVA programming language, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method of displaying media information, comprising:
   generating a three-dimensional image using a graphics processing unit, the three-dimensional image consisting essentially of two display surfaces, the three-dimensional image having an axis of rotation, the three-dimensional image including a first display surface that is an Electronic Program Guide (EPG) surface having a first edge connected to the axis of rotation and a second display surface that is a Personal Video Recorder (PVR) Guide surface having a second edge connected to the single axis of rotation, the first display surface and the second display surface being orthogonal to each other; and
   in response to a user input, the graphics processing unit rotating said three-dimensional image about said axis with the degree of rotation being selectable according to said user input to permit a user to select a face-on view of one of said display surfaces while maintaining a partial view of the other display surface to provide contextual information to facilitate a user navigating between EPG information and PVR information;
   the EPG surface displaying information for a plurality of television channels;
   the PVR guide surface providing PVR information for a plurality of video files.

2. The method of claim 1, wherein in response to a user input, one of said display surfaces is rotated into a face-on view while maintaining a partial view of the other planar surface.

3. The method of claim 2 wherein said display surface is moved into a face-on view, the method further comprising:
displaying objects representing drawers on said second display surface;
responsive to a user input requesting information for a selected drawer,
opening said selected drawer orthogonally to said second display surface and displaying information describing stored video files associated with said selected drawer.

4. The method of claim 3, wherein said displaying information describing stored video files comprises:
displaying at least one picture.

5. The method of claim 3, wherein said displaying information describing stored video files comprises:
playing at least one audio file.

6. The method of claim 3, wherein said displaying information comprises: revealing at least one data pop-up configured for a user to obtain additional information for at least one stored video file.

7. The method of claim 6, wherein said at least one data pop-up is a polyhedron having a media thumbnail associated with at least one face of the polyhedron.

8. The method of claim 7, further comprising:
rotating said pop-up to reveal a thumbnail of said polyhedron disposed on a face of said polyhedron that is initially hidden from view.

9. The method of claim 7, wherein said data pop-up is a cube having media thumbnails associated with faces of the cube.

10. The method of claim 7, wherein said media thumbnail is selected from the group consisting of: an audio thumbnail, a still picture, and a video clip.

11. The method of claim 1, wherein the PVR guide surface organizes the plurality of video files according to a plurality of content categories.

12. A media system, comprising:
a personal computer having a central processing unit;
a graphics processing unit receiving commands from the central processing unit to generate three-dimensional images for display;
a tuner box to permit a user to input commands to the personal computer via a remote control;
the system having a mode of operation in which said system generates a three-dimensional image consisting essentially of two display surfaces, the three-dimensional image having an axis of rotation, the three-dimensional image including a first display surface that is an Electronic Program Guide (EPG) surface having a first edge connected to the axis of rotation and a second display surface that is a Personal Video Recorder (PVR) Guide surface having a second edge connected to the single axis of rotation, the first display surface and the second display surface being orthogonal to each other; and
in response to a user input, rotating said three-dimensional image about said axis with the degree of rotation being selectable according to said user input to permit a user to select a face-on view of one of said display surfaces while maintaining a partial view of the other display surface to provide contextual information to facilitate a user navigating between EPG information and PVR information;
the EPG surface displaying information for a plurality of television channels;
the PVR guide surface providing PVR information for a plurality of video files.

13. The system of claim 12, wherein the PVR guide surface organizes the plurality of video files according to a plurality of content categories.

14. A computer readable medium storing computer executable instructions to cause a media system having a personal computer including a graphics processing unit to:
generate a three-dimensional image using the graphics processing unit, the three-dimensional image consisting essentially of two display surfaces, the three-dimensional image having an axis of rotation, the three-dimensional image including a first display surface that is an Electronic Program Guide (EPG) surface having a first edge connected to the axis of rotation and a second display surface that is a Personal Video Recorder (PVR) Guide surface having a second edge connected to the single axis of rotation, the first display surface and the second display surface being orthogonal to each other; and
in response to a user input, the graphics processing unit rotating said three-dimensional image about said axis with the degree of rotation being selectable according to said user input to permit a user to select a face-on view of one of said display surfaces while maintaining a partial view of the other display surface to provide contextual information to facilitate a user navigating between EPG information and PVR information;
the EPG surface displaying information for a plurality of television channels;
the PVR guide surface providing PVR information for a plurality of video files.

* * * * *